(12) United States Patent
Matsushiro

(10) Patent No.: US 6,301,300 B1
(45) Date of Patent: Oct. 9, 2001

(54) METHOD AND APPARATUS FOR EFFICIENTLY CODING AND DECODING SPARSE IMAGES

(75) Inventor: Nobuhito Matsushiro, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/106,001

(22) Filed: Jun. 29, 1998

(30) Foreign Application Priority Data

Jul. 4, 1997 (JP) ............................................ 9-194807

(51) Int. Cl.$^7$ ........................................... H04B 1/66

(52) U.S. Cl. ................... 375/240.08; 348/410.1; 358/261.1; 382/243; 382/245

(58) Field of Search .................. 348/410.1; 375/240.08, 375/250; 358/261.1, 261.3, 427, 432, 433; 382/243, 245, 246

(56) References Cited

U.S. PATENT DOCUMENTS

| | | | | |
|---|---|---|---|---|
| 3,184,542 | * | 5/1965 | Horsley | 375/250 |
| 4,103,287 | * | 7/1978 | Frank | 382/246 |
| 4,107,648 | * | 8/1978 | Frank | 382/246 |
| 4,307,377 | * | 12/1981 | Pferd et al. | 382/243 |

* cited by examiner

*Primary Examiner*—Howard Britton
(74) *Attorney, Agent, or Firm*—Rabin & Berdo, P.C.

(57) ABSTRACT

An image is coded by counting runs of non-background picture elements, and counting consecutive scanning lines having only background picture elements. Consecutive scanning lines of this type are coded as a single command and value, giving the number of scanning lines. Consecutive scanning lines having identical numbers of runs of non-background picture elements are coded as another single command and value, giving the run count, followed by run information describing each run. Sparse images, consisting mostly of background area, can be coded efficiently in this way.

49 Claims, 16 Drawing Sheets

METHOD AND APPARATUS FOR EFFICIENTLY CODING AND DECODING SPARSE IMAGES

BACKGROUND OF THE INVENTION

The present invention relates to a method and apparatus useful for coding and decoding images such as line drawings that comprise mostly background area.

Black-and-white bi-level images can be encoded by run-length coding, which encodes the number of consecutive picture elements or pixels having the same value. When this type of image is transmitted by facsimile, for example, the image is scanned a line at a time, and each scanning line is encoded as run lengths specifying the relative positions of the pixels at which a change from black to white, or from white to black, occurs. In the modified Huffman (MH) code adopted in group-three facsimile equipment, the run-length information is further coded by use of variable-length coding tables, using different tables for black runs and white runs, because the two types of runs have different statistical properties.

When this type of run-length coding is applied to an image comprising mostly white background area, however, most of the coded data is used to encode long runs of background pixels. Variable-length coding of the background in this type of image is inefficient, because the variable-length coding rule forces the use of many redundant bits. If the redundancy could be reduced, higher data compression ratios could be obtained.

More efficient coding schemes, such as arithmetic coding, are known, but they tend to be computationally demanding in terms of program complexity, memory usage, and processing time.

The above problems are not limited to bi-level images, but also occurs in other types of sparse images, including images that employ several colors, or multiple shades of gray. These problems moreover occur not only in facsimile transmission, but also in image storage and retrieval, and in the transmission of image data from a computer to a printer.

SUMMARY OF THE INVENTION

An object of the present invention is to code sparse images efficiently, by reducing the amount of coded image data representing background areas.

Another object of the invention is to code and decode sparse images without extensive computation.

Another object is to code and decode sparse images without extensive memory usage.

The invented image coding method comprises the steps of:

counting runs of non-background pixels, obtaining a run count for each scanning line in the image;

counting consecutive scanning lines having run counts of zero;

coding consecutive scanning lines having run counts of zero as a first command and a first value, the first value indicating the number of scanning lines; and coding consecutive scanning lines having identical run counts not equal to zero as a second command, a second value indicating the run count, and one-dimensional run information describing each run in each scanning line.

The second value may specify the run count directly, or may specify a value to be added to or subtracted from the previous run count. The run information may give the starting and ending coordinates of each run, or a starting coordinate and run length. If necessary, the run information may also give a single pixel value shared by all pixels in the run, a starting gray level and an ending gray level, or a starting gray level and a gray-level increment value.

The invented decoding method comprises the steps of:

analyzing the coded image data to detect the first and second commands;

generating entire scanning lines of background pixels according to the first command and its accompanying first value; and generating scanning lines with runs of non-background pixels according to the second command, its accompanying second value, and the run information.

If necessary, the decoding method also comprises the steps of setting and modifying an internal run count according to the first command, second command, and second value, the step of assigning gray levels to the pixels in each run by interpolation between starting and ending gray levels, or the step of assigning gray levels by successively adding a gray-level increment value to a starting gray level.

The invented coder comprises a run analyzer for counting runs of non-background pixels and obtaining one-dimensional run information, a run information buffer for temporarily storing the run information for each scanning line, a run count comparator for comparing the run count of each scanning line with the run count of the preceding scanning line, an offset counter for counting consecutive scanning lines having run counts of zero, and a code assembler. The code assembler outputs a first command and first value when the run count changes from zero to a nonzero value, outputs a second command and second value when the run count changes from any value to a non-zero value, and outputs the run information stored in the run information buffer.

The invented decoder comprises a command analyzer for detecting the first and second commands, and a decoding section for generating scanning lines according to the first and second commands, first and second values, and run information. If necessary, the decoder also comprises a run counter and/or an interpolator.

DETAILED DESCRIPTION OF THE INVENTION

Embodiments of the invention will be described with reference to the attached illustrative drawings.

Figures 1A, 1B:
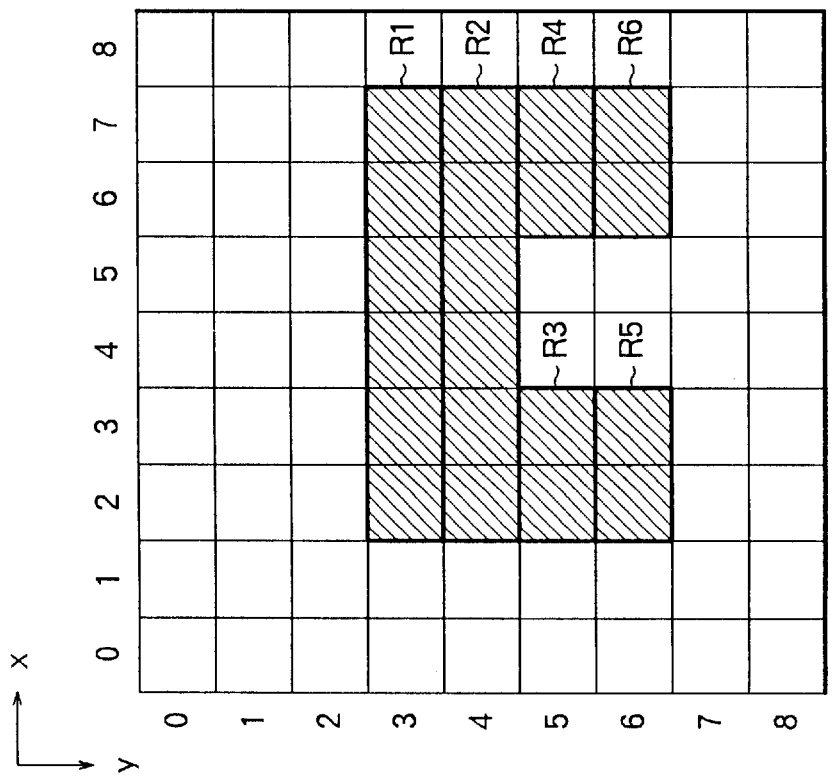
FIG. 1A shows an example of a bi-level image.
FIG. 1B indicates how the image in FIG. 1A is coded according to a first embodiment of the invention.

FIG. 1A shows a sample image that will be used to explain the first embodiment of the present invention. The image is a bi-level image comprising only black and white pixels, the white pixels being background pixels. Cross-hatching is used to indicate black pixels.

The image has nine scanning lines of nine pixels each. In the indicated x-y coordinate system, scanning lines are identified by y-coordinates from zero to eight, and pixel positions in each scanning line by x-coordinates from zero to eight. The scanning lines are horizontal in the drawing. A scanning sequence is defined by taking the scanning lines in ascending order of their y-coordinates, and the pixels in each scanning line in ascending order of their x-coordinates.

A black run refers to a sequence of consecutive black pixels in the same scanning line. In FIG. 1A there are six black runs, numbered from R1 to R6.

The coding method of the first embodiment is based on counting the number of black runs in each scanning line. This number is referred to as the black run count of the scanning line. When all-white scanning lines occur, the number of consecutive all-white scanning lines, referred to below simply as white lines, is also counted; this number is referred to as an offset value. A group of one or more consecutive scanning lines having the same black run count, not immediately preceded or followed by a scanning line having the same black run count, is referred to as a segment.

With this terminology, the coding method of the first embodiment can be described as follows. A segment of white lines is coded as a single offset command followed by the offset value of the segment. A segment having a non-zero black run count is coded by a single run command, followed by the black run count, then the run information for each black run in each scanning line in the segment, taken in the scanning sequence. The run information is one-dimensional, giving the x-coordinates of the starting and ending pixels of the run, but not specifying the y-coordinate of the scanning line.

FIG. 1B indicates the coding of the image in FIG. 1A. The initial segment of three white lines is coded as an offset command, followed by the offset value of three, in the top line of FIG. 1B. The offset command and value are followed by a run command, indicated as 'runs/line' in FIG. 1B, and a black run count value of one. Run R1 is then coded by its starting x-coordinate (two) and ending x-coordinate (seven). Run R2 is coded similarly.

In the next two scanning lines, the black run count changes from one to two, so another run command is inserted, followed by a run count of two. Run R3 is coded by its starting x-coordinate (two) and ending x-coordinate (three). Run R4 is coded by its starting x-coordinate (six) and ending x-coordinate (seven). Runs R5 and R6 are coded similarly. The image ends with two white lines, which are coded by another offset command and offset value (two).

In an image of this size, the run coordinates, black run count values, and offset values can be coded as four-bit binary numbers taking on values from zero to nine. The run command and offset command can then be coded as four-bit binary numbers with values higher than nine: for example, 'fourteen' can designate a run command, and 'fifteen' an offset command. Each line in FIG. 1B then becomes a single eight-bit byte.

Images of arbitrary size can be coded in the same way by increasing the number of bits, the run and offset commands again being assigned values that are not used for run coordinates, black run counts, and offset values.

Figure 2:
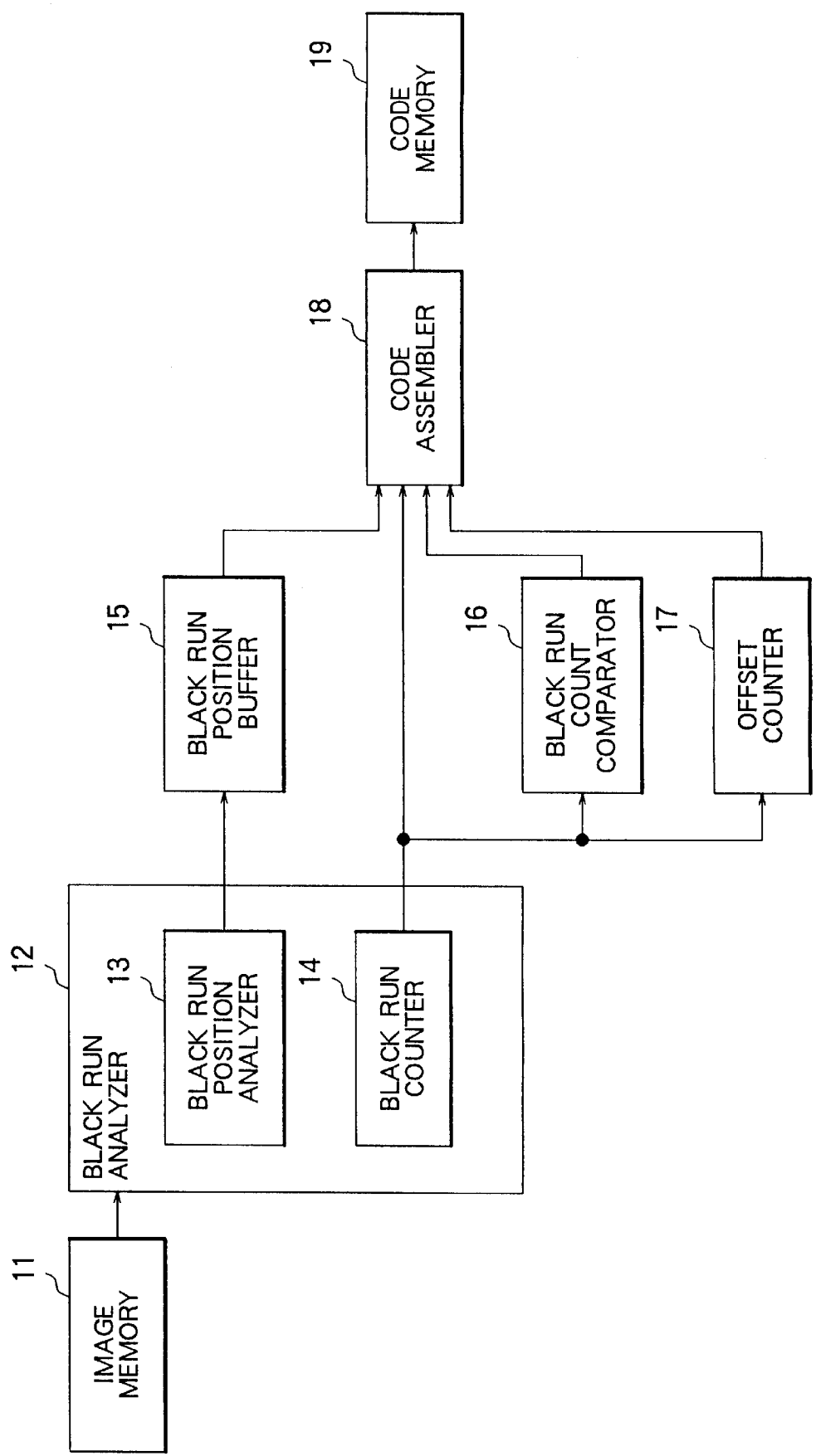
FIG. 2 is a block diagram of a coder according to the first embodiment.

FIG. 2 shows an example of a coder employing the coding method of the first embodiment. The coder comprises an image memory 11, a black run analyzer 12 having a black run position analyzer 13 and black run counter 14, a black run information buffer 15, a black run count comparator 16, an offset counter 17, a code assembler 18, and a code memory 19.

The image memory 11 stores the image to be coded. The image may be stored in bit-mapped form, or in a compressed form such as a conventional run-length coded form.

The black run analyzer 12 reads the image data stored in the image memory 11 one scanning line at a time. The black run position analyzer 13 determines the starting and ending x-coordinates of each black run in the scanning line, and writes this run information in the black run information buffer 15. The black run counter 14 counts the number of black runs in the scanning line, and sends this information to the black run count comparator 16, offset counter 17, and code assembler 18.

The black run information buffer 15 temporarily stores the run information obtained by the black run position analyzer 13 for each scanning line, until the run information is read by the code assembler 18.

The black run count comparator 16 internally stores the run counts obtained by the black run counter 14 for the current scanning line and the preceding scanning line, compares these two counts, and sends the code assembler 18 a match signal or an unmatch signal, indicating whether the two counts agree.

The offset counter 17 maintains an internal offset value, which is incremented by one each time the black run counter 14 outputs a black run count of zero. At certain times, the offset counter 17 sends the offset value to the code assembler 18, and resets the offset value to zero.

The code assembler 18 writes offset commands, offset values, run commands, black run count values, and run information as coded data in the code memory 19. The offset values, black run count values, and run information are preferably written as binary numbers, without variable-length coding. The code assembler 18 also maintains an internal flag that indicates whether the black run count in the preceding scanning line was zero.

The code memory 19 stores the coded data pending transmission over a communication channel or other use.

The operation of the coder in FIG. 2 will now be described in more detail with reference to FIGS. 3 and 4. These flowcharts illustrate the processing of one scanning line.

Figure 3:
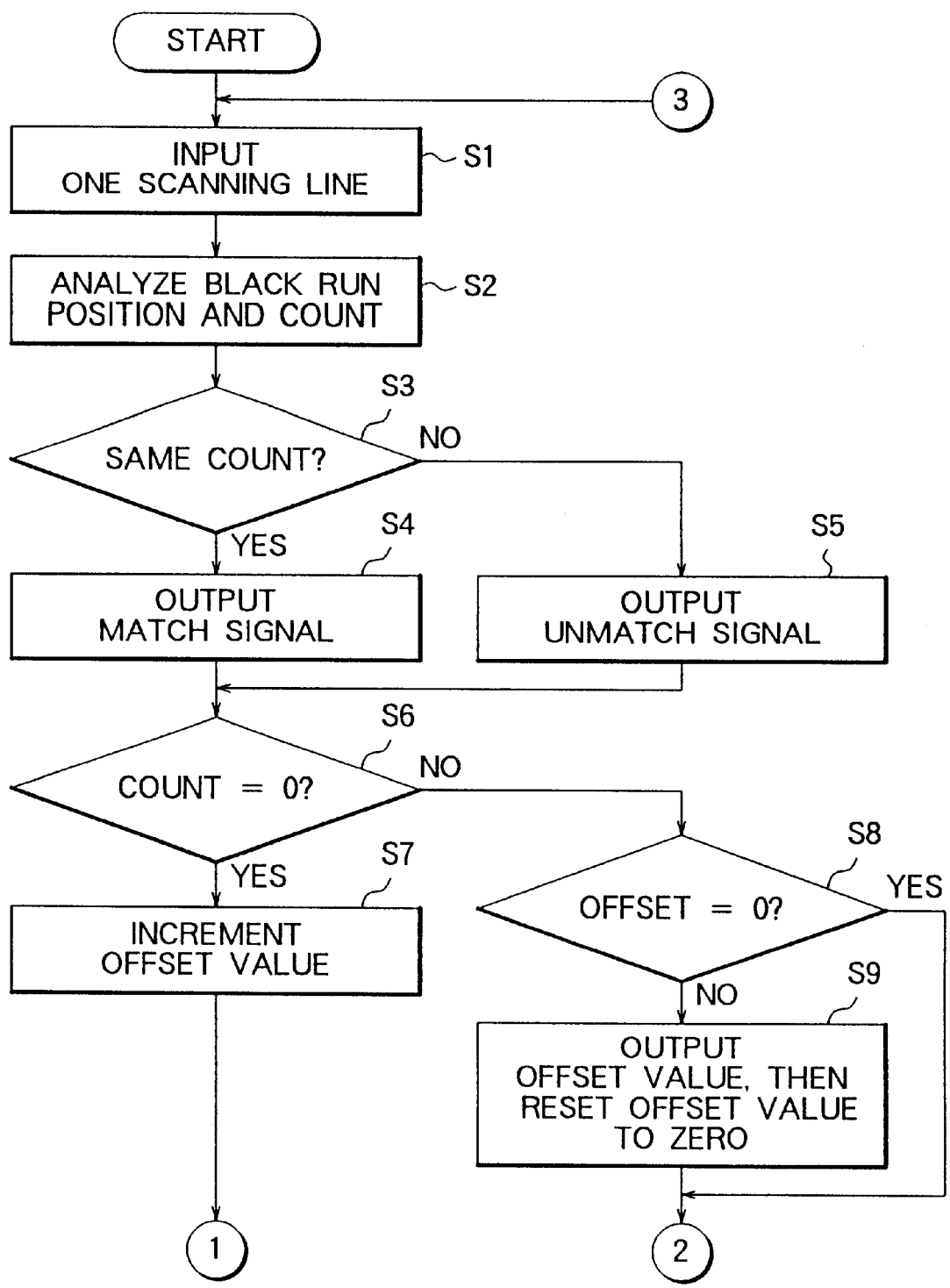
FIG. 3 is a first part of a flowchart illustrating coding operations in the first embodiment.

Referring to FIG. 3, in step S1, the black run analyzer 12 reads one scanning line from the image memory 11. In step S2, the black run counter 14 counts the number of black runs in the scanning line, and the black run position analyzer 13 writes the starting and ending x-coordinates of each black run in the black run information buffer 15.

In step S3, the black run count comparator 16 compares the black run count of the current scanning line with the black run count of the preceding scanning line. If both scanning lines have the same black run count, the black run count comparator 16 outputs a match signal in step S4. If the two counts differ, the black run count comparator 16 outputs an unmatch signal in step S5.

In step S6, the offset counter 17 tests the black run count obtained by the black run counter 14 for the current scanning line. If the black run count is zero, then in step S7, the offset counter 17 internally increments the offset value, after which processing proceeds to step S16 in FIG. 4. If the black run count is not zero, then in step S8, the offset counter 17 internally tests the offset value. If the offset value is not zero, then in step S9, the offset counter 17 sends the offset value to the code assembler 18, and internally resets the offset value to zero. After step S9, or if the offset value is zero in step S8, processing proceeds to step S10 in FIG. 4.

In step S10, the code assembler 18 tests the black run count output by the black run counter 14 for the current scanning line. If the black run count is zero, processing branches to step S16, described below.

If the black run count is not zero, then in step S11, the code assembler 18 tests its internal flag to determine whether the black run count in the preceding scanning line was zero. If so, then in step S12, the code assembler 18 writes an offset command in the code memory 19, followed by the non-zero offset value received from the offset counter 17.

Following step S12, or if the black run count of the preceding scanning line was not zero in step S11, in step S13 the code assembler 18 tests the signal received from the black run count comparator 16. If an unmatch signal was received, then in step S14, the code assembler 18 writes a run command in the code memory 19, followed by the black run count received from the black run counter 14, and the run information read from the black run information buffer 15 for all of the black runs in the current scanning line. If a match signal was received, then in step S15, the code assembler 18 simply writes the run information read from the black run information buffer 15 in the code memory 19.

Following step S7, step S14, step S15, or an affirmative result in step S10, a decision is made in step 516 as to whether there are any more scanning lines to be coded. This decision can be made on the basis of, for example, an end-of-file code stored in the image memory 11. If another scanning line is present, the process returns to step S1 in FIG. 3. If no further scanning lines are present, then in step S17, the offset counter 17 tests the current offset value. If this value is zero, the coding process ends. If the offset value is not zero, then in step S18 the code assembler 18 writes an offset command and the offset value in the code memory 19, after which the coding process ends.

Figure 4:
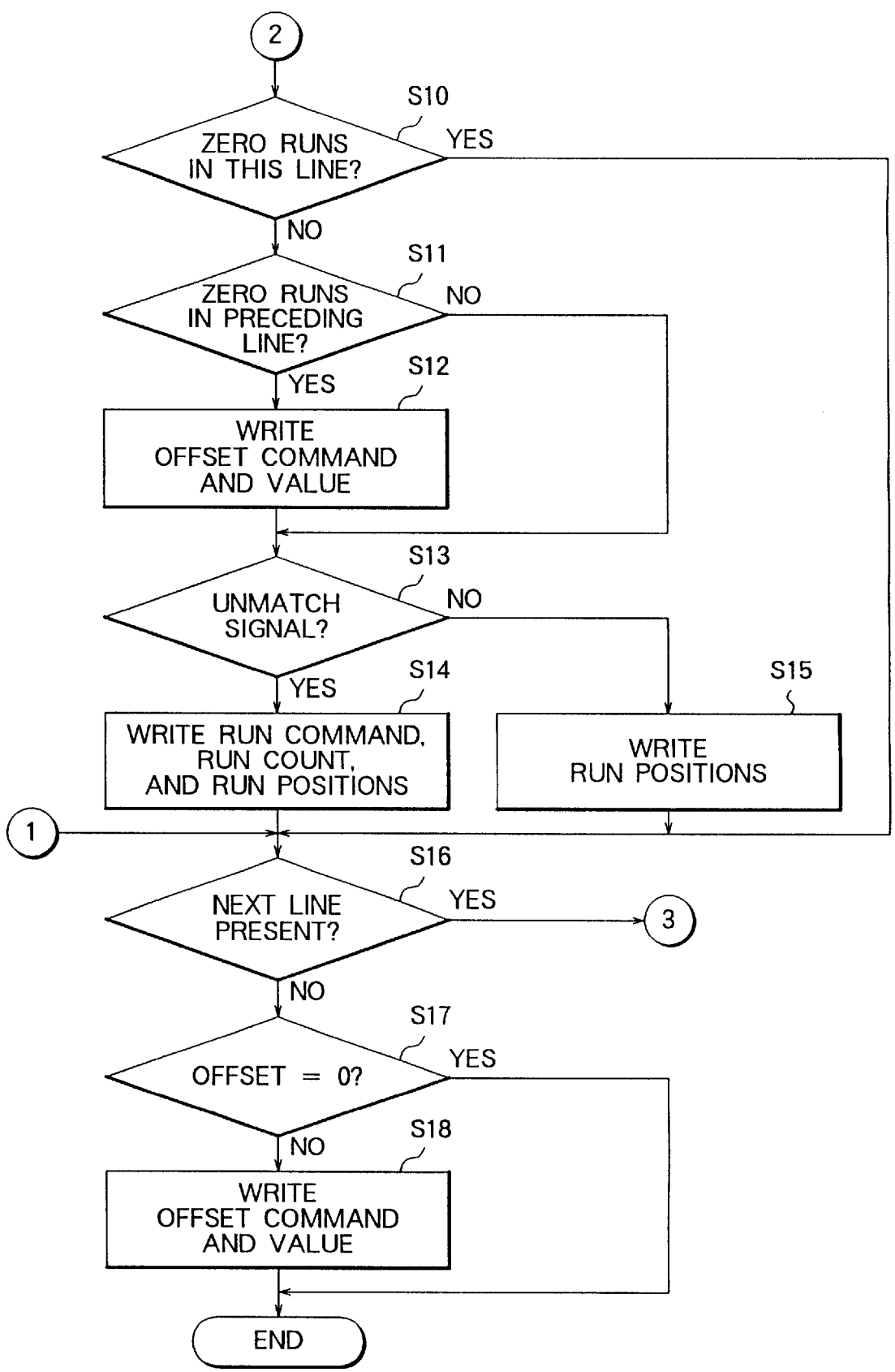
FIG. 4 is a second part of the flowchart in FIG. 3.

By following the procedure in FIGS. 3 and 4, the code assembler 18 writes the starting and ending x-coordinates of all black runs in the code memory 19, writes a run command and black run count when the black run count per scanning line changes from any value to a non-zero value, and writes an offset command and offset value when the black run count changes from zero to a non-zero value. This procedure produces coded data of the type shown in FIG. 1B.

Figure 5:
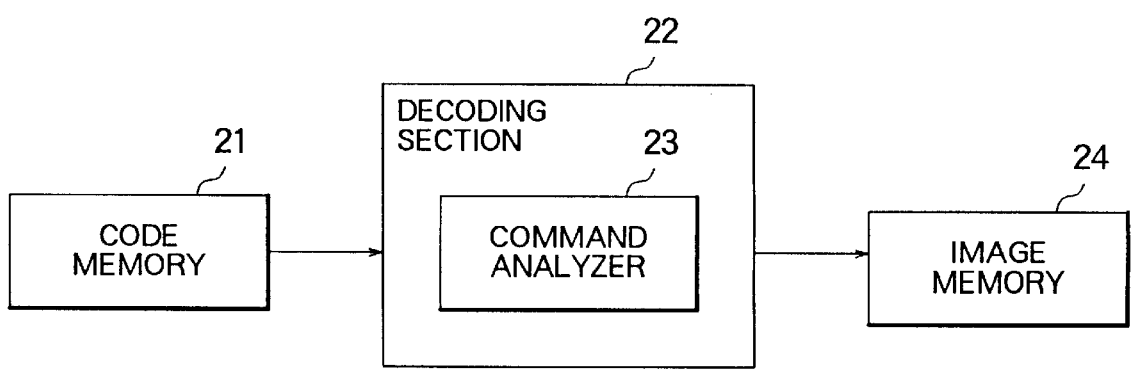
FIG. 5 is a block diagram of a decoder according to the first embodiment.

FIG. 5 shows the configuration of a decoder for decoding the coded image data produced by the coder in FIG. 2. The decoder comprises a code memory 21, a decoding section 22 having a command analyzer 23, and an image memory 24.

The code memory 21 stores the coded image data. The decoding section 22 reads the coded image data in sequence from beginning to end, stores the most recently read black run count, generates decoded image data, and writes the decoded image data in the image memory 24. The command analyzer 23 analyzes commands occurring in the coded image data. The image memory 24 stores the decoded image data pending printing or other use.

The operation of the decoder in FIG. 5 will be described with reference to FIG. 6.

In step S21, the decoding section 22 reads data from the code memory 21. The amount of data read corresponds, for example, to the length of one offset or run command and the accompanying offset or run-count value, or the length of a pair of x-coordinates.

In step S22, the command analyzer 23 attempts to detect an offset command in the data read in step S21. If an offset command is detected, in step S22 the decoding section 22 generates the number of white lines specified by the offset value that follows the offset command, and writes these lines into the image memory 24.

If an offset command is not detected, then in step S24, the command analyzer 23 attempts to detect a run command. If a run command is detected, then in step S25, the decoding section 22 internally stores the black run count that follows the run command.

Following step S25, or if no run command is detected in step S24, the decoding section 22 reads further data from the code memory 21 as necessary to obtain run information, generates a decoded scanning line containing black runs starting and ending at the positions specified by the run information, and writes this scanning line in the image memory 24. The amount of data to be read in step S26 is determined from the black run count most recently obtained in step S25.

Following step S23 or S26, in step S27 the decoding section 22 decides whether the code memory 21 contains any more data to be decoded. If so, processing returns to step S21 to begin decoding the next scanning line. If not, the decoding process ends.

As described above, the first embodiment enables an arbitrary number of white lines to be coded by a single offset command and value, and uses a single run command to designate a segment of an arbitrary number of consecutive lines with identical non-zero black run counts. For line drawings and other sparse images comprising mostly background, this coding scheme is more efficient than conventional schemes such as the coding scheme used in group-three facsimile transmissions. A particular advantage is that no special code is required to indicate the end of each scanning line.

The first embodiment is also computationally simple, and does not require the storage of large variable-length coding tables or large amounts of temporary data. These advantages enable the coding and decoding processes to be carried out at high speed, using only a small amount of memory.

Figure 7:
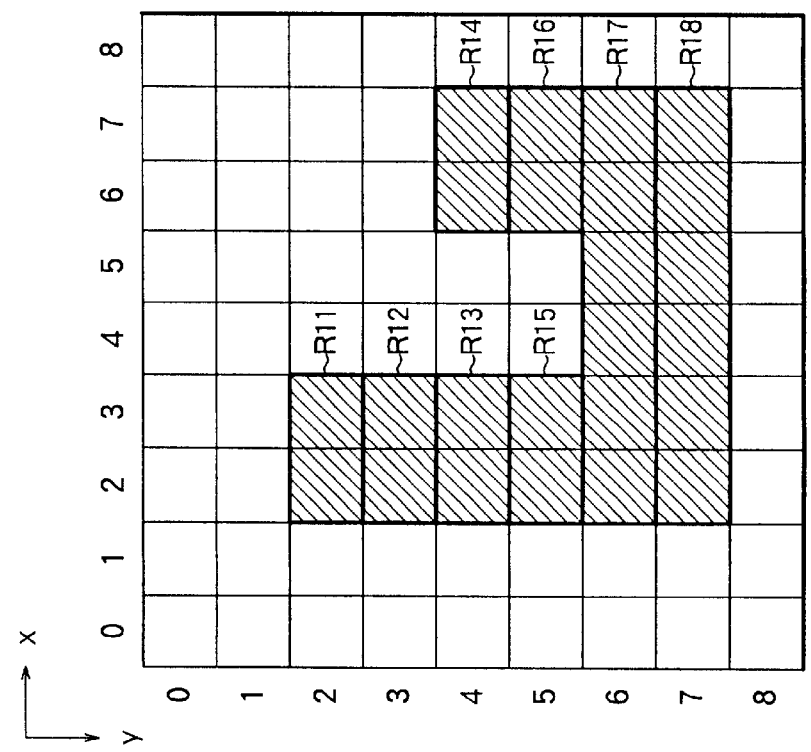
FIG. 7A shows another example of a bi-level image.
FIG. 7B indicates how the image in FIG. 7A is coded according to a second embodiment of the invention.

FIG. 7A shows a sample image that will be used to explain a second embodiment of the present invention. The image is generally similar to the image in FIG. 1A, but contains eight black runs, numbered from R11 to R18.

The second embodiment differs from the first embodiment in regard to the coding of run information. Instead of coding the starting and ending positions of each run, the second embodiment codes the starting position and run length. The second embodiment also replaces the run command of the first embodiment with a pair of commands that alter the black run count: an add command increases the black run count; a subtract command decreases the black run count. The add and subtract commands are followed by the value to be added to or subtracted from the run count. The second embodiment employs the same offset command and offset value as in the first embodiment.

FIG. 7B illustrates the coding of the image in FIG. 7A according to the second embodiment, and indicates the value of the black run count C at each point in the coded data.

The two white lines at the top of FIG. 7A are coded at the top of FIG. 7B as an offset command with an offset value of two. The offset command resets the black run count value C to zero, as indicated.

After these two white lines, the black run count per scanning line increases from zero to one, so an add command is inserted, followed by a value of one. The next two lines in FIG. 7B encode runs R11 and R12, giving the starting x-coordinate (two) and length (two) of each run.

The black run count per scanning line now increases again, from one to two, so another add command is inserted, followed by a value of one. The next four lines in FIG. 7B encode runs R13, R14, R15, and R16.

Next, the black run count per scanning line decreases from two to one, so a subtract command is inserted, followed by a value of one. The next two lines in FIG. 7B encode runs R17 and R18.

The final white line in FIG. 1A is coded in FIG. 1B as another offset command, with an offset value of one.

Figure 8:
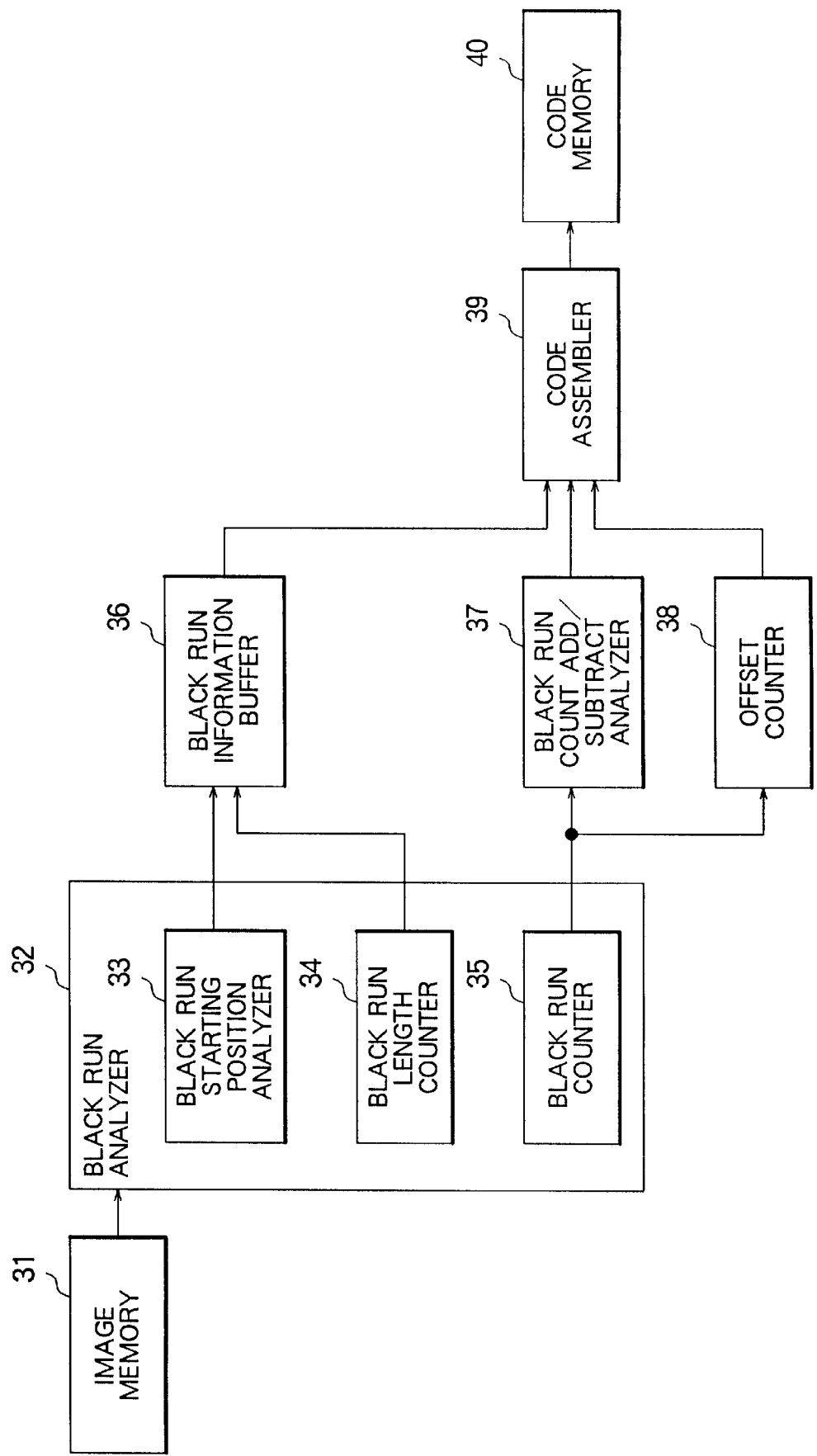
FIG. 8 is a block diagram of a coder according to the second embodiment.

FIG. 8 shows an example of a coder employing the coding method of the second embodiment. The coder comprises an image memory 31, a black run analyzer 32 having a black run starting position analyzer 33, black run length counter 34, and black run counter 35, a black run information buffer 36, a black run count comparator 37, an offset counter 38, a code assembler 39, and a code memory 40.

The image memory 31 is similar to the image memory 11 in the first embodiment.

The black run analyzer 32 reads the image data stored in the image memory 31 one scanning line at a time. The black run starting position analyzer 33 and black run length counter 34 analyze the black runs in the scanning line. The black run starting position analyzer 33 stores the x-coordinate of the starting position of each black run in the black run information buffer 36. The black run length counter 34 stores the run length of each black run in the black run information buffer 36. The black run counter 35 counts the number of black runs in the scanning line, and sends the black run count value for each scanning line to the black run count comparator 37 and the offset counter 38.

The black run information buffer 36 temporarily stores the run information obtained by the black run start position analyzer 33 and black run length counter 34 for each scanning line, until read by the code assembler 39.

The black run count comparator 37 stores the black run counts output by the black run counter 14 for the current scanning line and the preceding line in registers (not visible), subtracts the black run count of the preceding scanning line from the black run count of the current scanning line, and sends the difference to the code assembler 39.

The offset counter 38 is similar to the offset counter 17 in the first embodiment.

The code assembler 39 writes offset commands, offset values, add commands, subtract commands, absolute differ-ence values, and run information in the code memory 40, according to information received from the black run information buffer 36, black run count comparator 37, and offset counter 38. The code assembler 39 also has an internal flag that indicates whether the black run count in the preceding scanning line was zero.

The code memory 40 is similar to the code memory 19 in the first embodiment.

Figure 9:
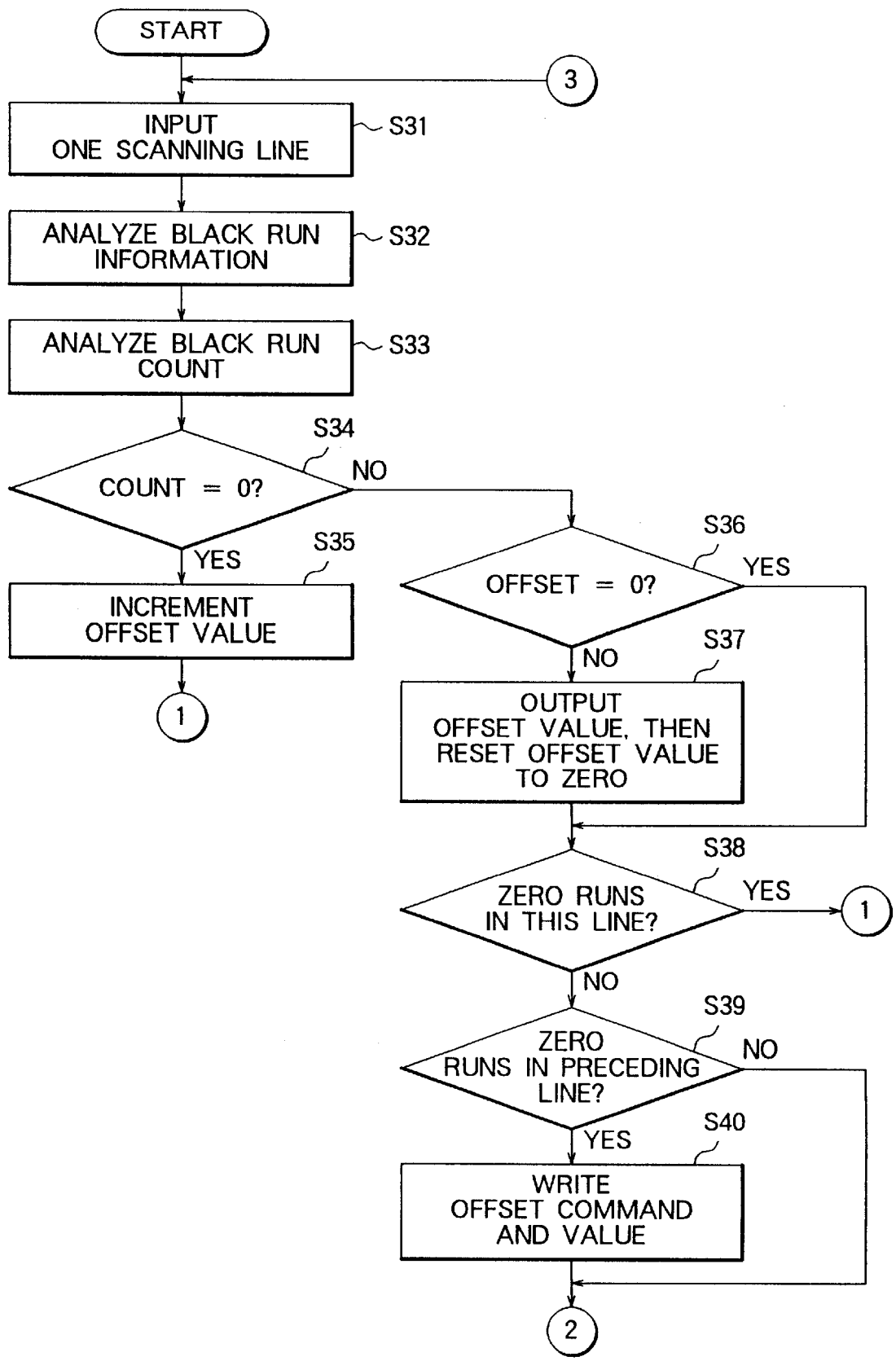
FIG. 9 is a first part of a flowchart illustrating coding operations in the second embodiment.
Figure 10:
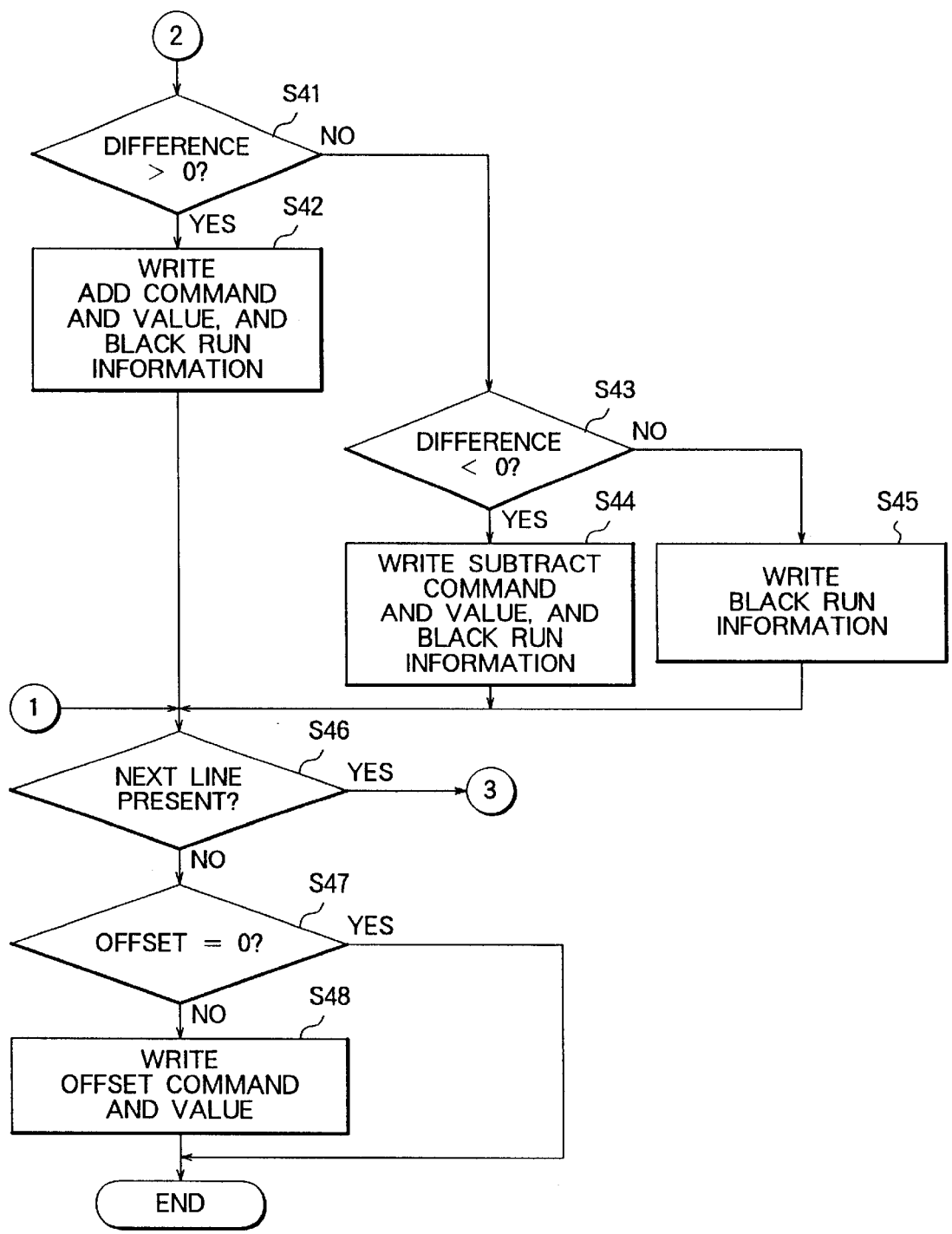
FIG. 10 is a second part of the flowchart in FIG. 9.

The operation of the coder in FIG. 8 will now be described in more detail with reference to FIGS. 9 and 10.

Steps S31, S32, and S33 are generally similar to steps Si and S2 in the first embodiment. One scanning line is read and analyzed to obtain its run information and black run count. The run information, now comprising the starting x-coordinate and length of each black run, is stored in the black run information buffer 36.

Steps S34, S35, S36, and S37 are similar to steps S6, S7, S8, and S9 in the first embodiment. The offset counter 38 tests the black run count of the current scanning line, and increments an internal offset value if the black run count is zero. If the black run count is not zero and the offset value maintained in the offset counter 38 is also not zero, the offset counter 38 sends the offset value to the code assembler 39, then internally resets the offset value to zero. Processing then proceeds to step S46 in FIG. 10 if the black run count of the current scanning line is zero, or to step S38 if the black run count is not zero.

In step S38, the black run count comparator 37 also tests the black run count of the current scanning line. If the black run count is zero, processing proceeds to step S46 in FIG. 10. If the black run count is not zero, then the black run count comparator 37 subtracts the black run count of the preceding scanning line from the black run count of the current scanning line, and sends the difference to the code assembler 39.

In step S39, the code assembler 39 tests its internal flag to determine whether the black run count of the preceding scanning line was zero. If so, then in step S40, the code assembler 39 writes an offset command and the offset value received from the offset counter 38 in the code memory 40. Following step S40, or following a negative result in step S39, processing proceeds to step S41 in FIG. 10.

In step S41, the code assembler 39 decides whether the difference received from the black run count comparator 37 is greater than zero. If so, then in step S42, the code assembler 39 writes an add command and the absolute value of the difference in the code memory 40, followed by the run information for the current scanning line, and proceeds to step S46. The add command indicates that the difference was positive.

If the difference is not greater than zero, then in step S43, the code assembler 39 decides whether the difference is less than zero. If so, then in step S44, the code assembler 39 writes a subtract command and the absolute value of the difference in the code memory 40, followed by the run information for the current scanning line. The subtract command indicates that the difference was negative.

If the difference is not negative, that is, if the difference is equal to zero, then in step S45, the code assembler 39 writes the run information for the current scanning line in the code memory 40. Step S44 or step S45 is followed by step S46.

In step S46, the code assembler 39 decides whether there is another scanning line to be coded, and returns to step S31 if there is. If no next scanning line is present, then in step S47, the offset value maintained in the offset counter 38 is tested. If the offset value is zero, the coding process ends. If the offset value is not zero, the code assembler 39 writes an offset command and the offset value in the code memory 40; then the coding process ends.

In steps S42, S44, and S45, the code assembler 39 preferably writes the run lengths of black runs, and the absolute difference values following the add and subtract commands, in a variable-length coded form, using short code words for small values.

Figure 11:
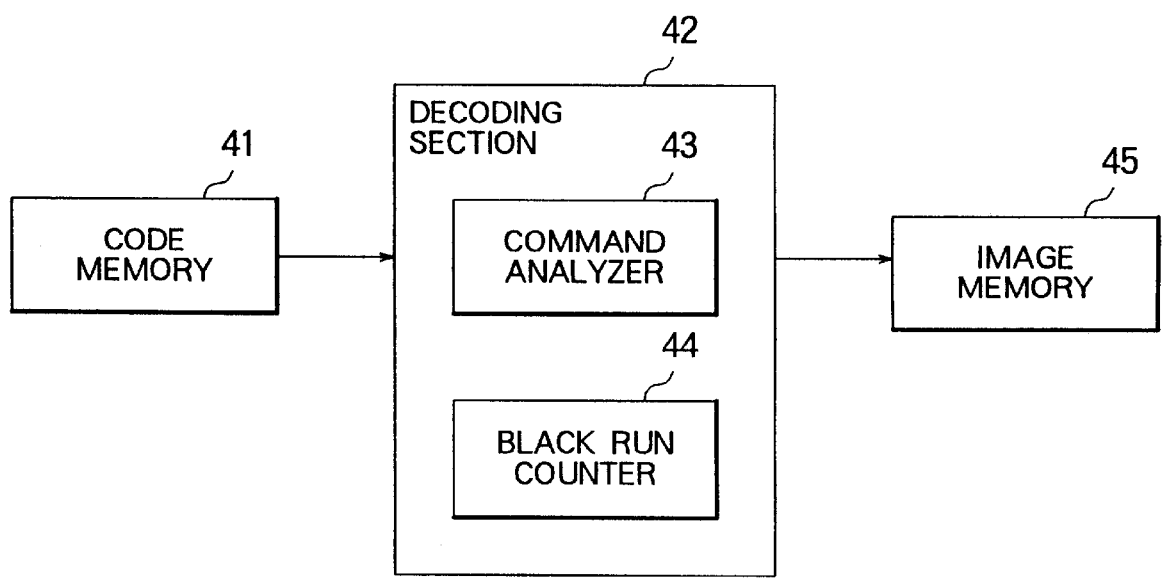
FIG. 11 is a block diagram of a decoder according to the second embodiment.

FIG. 11 shows the configuration of a decoder for decoding the coded image data produced by the coder in FIG. 8. The decoder comprises a code memory 41, a decoding section 42 having a command analyzer 43 and black run counter 44, and an image memory 45.

The code memory 41 is similar to the code memory 21 in the first embodiment. The decoding section 42 reads the coded image data stored in the code memory 41 in sequence from beginning to end, generates decoded image data, and writes the decoded image data in the image memory 45. The command analyzer 43 analyzes commands occurring in the coded image data. The black run counter 44 keeps track of the black run count. The image memory 45 stores the decoded image data pending printing or other use.

Figure 12:
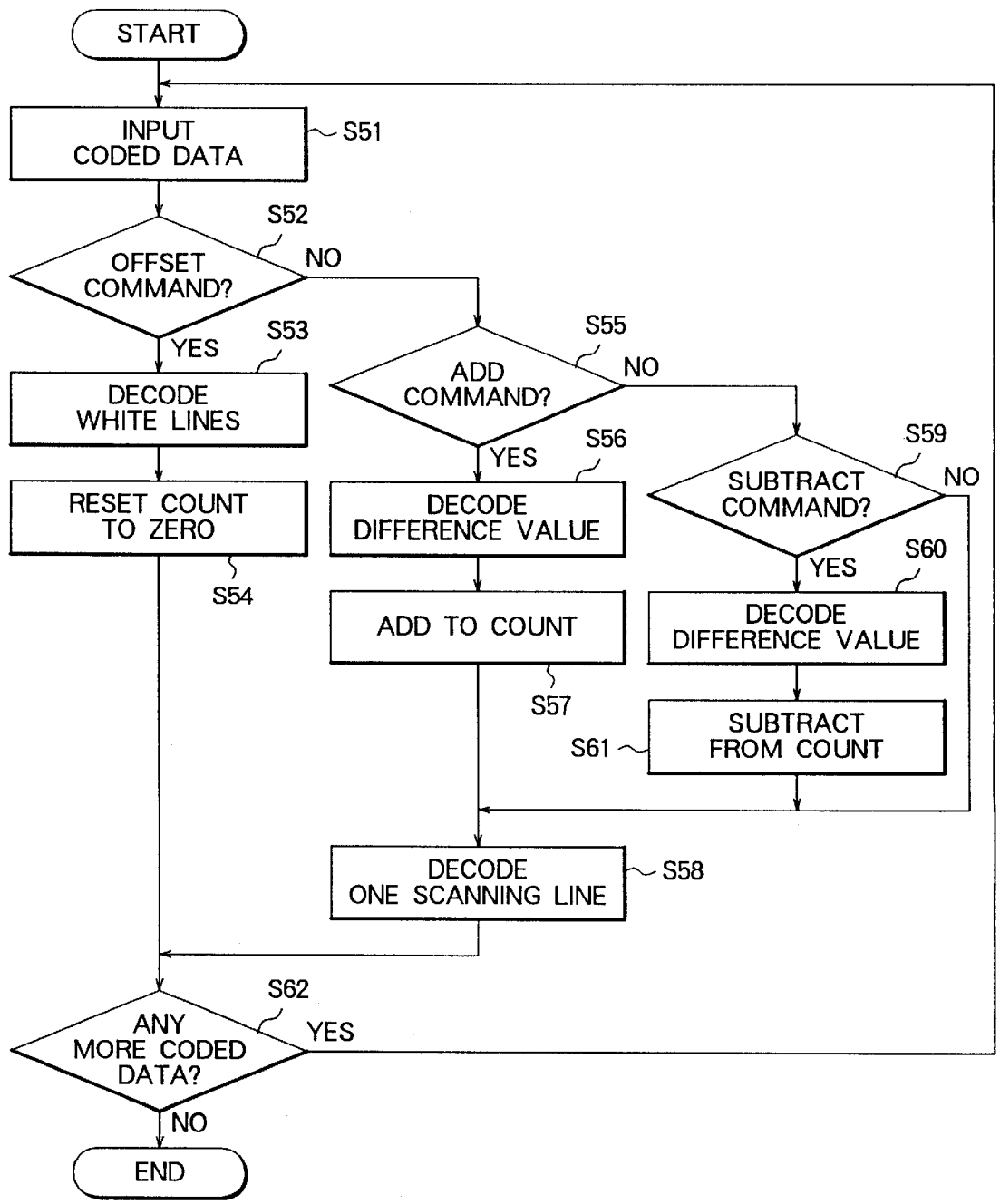
FIG. 12 is a flowchart illustrating decoding operations in the second embodiment.

The operation of the decoder in FIG. 11 will be described with reference to FIG. 12.

In step S51, the decoding section 42 reads data from the code memory 41. In step S52, the command analyzer 43 decides whether an offset command occurs in the data read in step S51. If so, in step S53 the decoding section 22 generates the number of white lines specified by the offset value following the offset command, and writes these lines into the image memory 45.

Following step S53, the decoding section 42 resets the black run counter 44 to zero in step S54, then proceeds to step S62 (described below).

If there is no offset command in the data read in step S51, then in step S55, the command analyzer 43 decides whether an add command is present. If so, then the decoding section 42 decodes the absolute difference value following the add command in step S5S, and adds this value to the count in the black run counter 44 in step S57.

Following step S57, in step S58 the decoding section 42 reads and decodes further data from the code memory 41 as necessary to obtain run information for one scanning line, generates a decoded scanning line containing black runs of the specified lengths in the specified starting positions, and writes this scanning line in the image memory 45. The amount of run information to be read is determined from the count given by the black run counter 44. Processing next proceeds to step S62 (described below).

If the command analyzer 43 does not find an add command in step S55, then in step S59, the command analyzer 43 decides whether there is a subtract command in the data read in step S51. If so, then the decoding section 42 decodes the absolute difference value following the subtract command in step S60, subtracts this value from the count in the black run counter 44 in step S61, and proceeds to step S58 (described above) to decode one scanning line. If no subtract command is present, processing proceeds directly from step S59 to step S58.

Following step S54 or S58, in step S62 the decoding section 42 decides whether the code memory 41 contains any more data to be decoded. If so, processing returns to step S51 to begin decoding the next scanning line. If not, the decoding process ends.

If the image coded in the second embodiment comprises mostly background area, then the length of the black runs tends to be short. Moreover, in most images, nearby pixels tend to be strongly correlated, so when the black run count changes, the change tends to be small. By using a variable-length code that codes small values in a small number of bits, the second embodiment can reduce the average number of bits needed to code run lengths in the run information, and the average number of bits needed to code the absolute difference values following add and subtract commands, thereby reducing the size of the coded data.

Like the first embodiment, the second embodiment is computationally simple, does not require the storage of large amounts of temporary data, and enables images to be coded and decoded at high speed with only modest memory usage.

The present invention can also be used to code color images. An example is an image comprising pixels of the colors black, white, blue, and red, the white pixels being background pixels. It will be assumed below that there is no gray scale, so each pixel has one of only four possible values, corresponding to the colors black, white, blue, and red.

A run in this type of image refers to a run of consecutive pixels having the same pixel value or color. For example, a blue run is a consecutive run of blue pixels.

Figure 13:
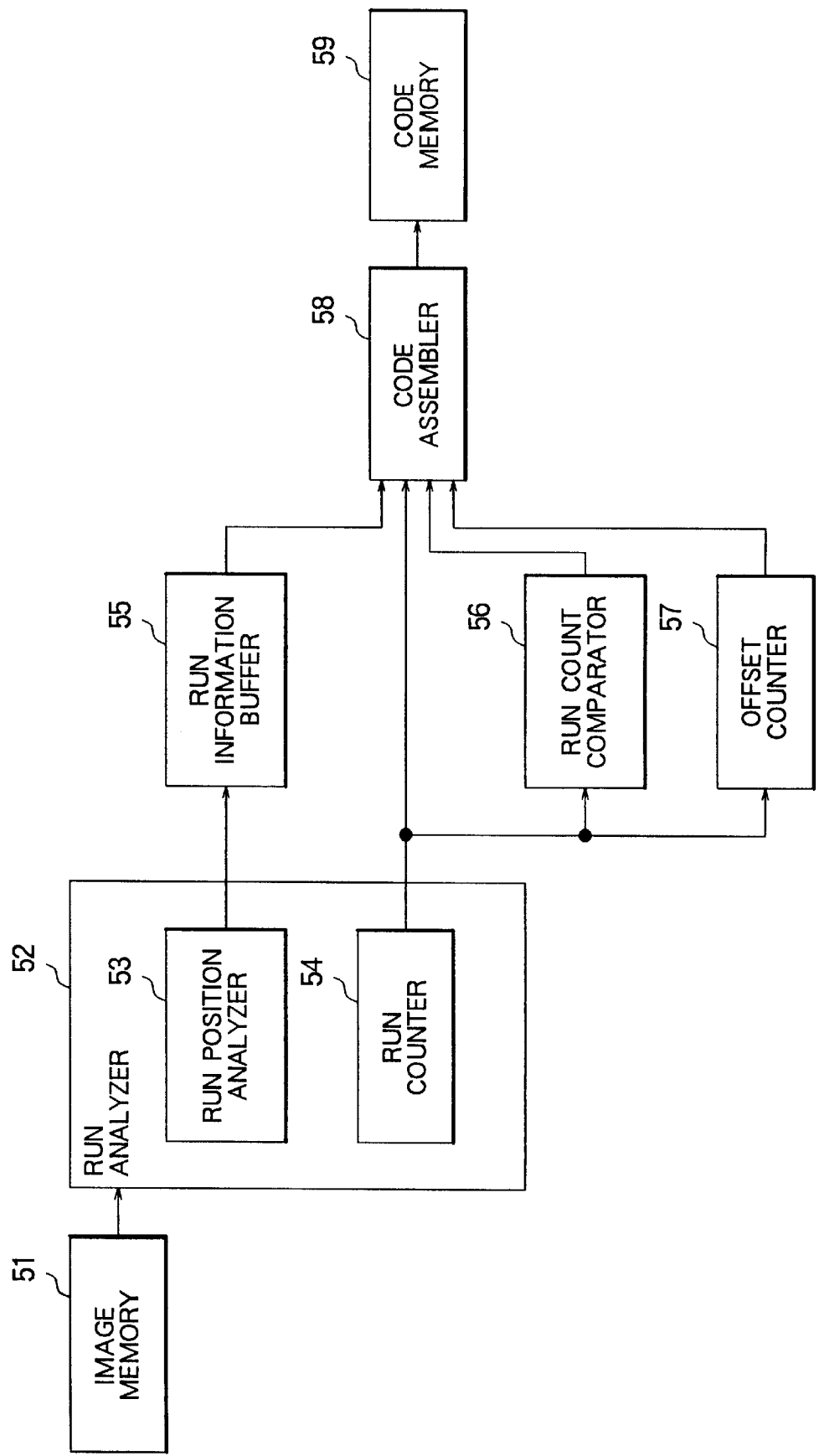
FIG. 13 is a block diagram of a coder according to a third embodiment of the invention.
Figure 14:
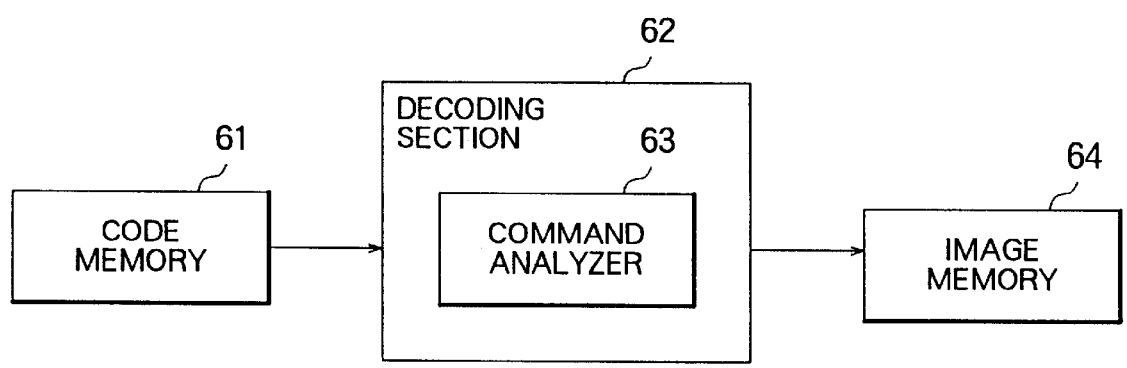
FIG. 14 is a block diagram of a decoder according to the third embodiment.

As a third embodiment of the invention, FIG. 13 shows a coder and FIG. 14 shows a decoder suitable for this type of image.

The coder in FIG. 13 is quite similar to the coder in the first embodiment, shown in FIG. 2. The image memory 51 stores image data in which the pixel values are, for example, two-bit values. The run analyzer 52 reads one scanning line at a time. The run position analyzer 53 analyzes runs of each color separately, and obtains run information giving the position and color of each black run, blue run, and red run. The run counter 54 determines the total number of runs of these three colors in each scanning line.

The run information buffer 55 stores the run information obtained by the run position analyzer 53. For each run, the run information comprises the starting x-coordinate, the ending x-coordinate, and the color (black, blue, or red) of the run.

The run count comparator 56 and offset counter 57 receive the total run count obtained by the run counter 54, representing the combined number of black, blue, and red runs in one scanning line, and operate in the same way as the black run count comparator 16 and offset counter 17 in the first embodiment. The run count comparator 56 compares the total run counts of the current scanning line and the preceding scanning line, and produces a match signal or an unmatch signal. The offset counter 57 maintains an internal offset value representing the number of consecutive white lines, and outputs the offset value whenever the total run count changes from zero to a non-zero value.

The code assembler 58 receives the total run count from the run counter 54, the match and unmatch signals from the run count comparator 56, and the offset values output by the offset counter 57, reads run information from the run information buffer 55, and writes offset commands, run commands, and run information in the code memory 59. The only difference from the coded data produced in the first embodiment is that the run information for each run now includes a pixel color value as well as the starting and ending positions.

The decoder shown in FIG. 14 has a code memory 61, a decoding section 62, a command analyzer 63, and an image memory 64. These elements operate in the same way as the corresponding elements in FIG. 5 in the first embodiment, except that the decoding section 62 reads color information as part of the run information, and generates scanning lines with black, blue, and red runs.

Figure 6:
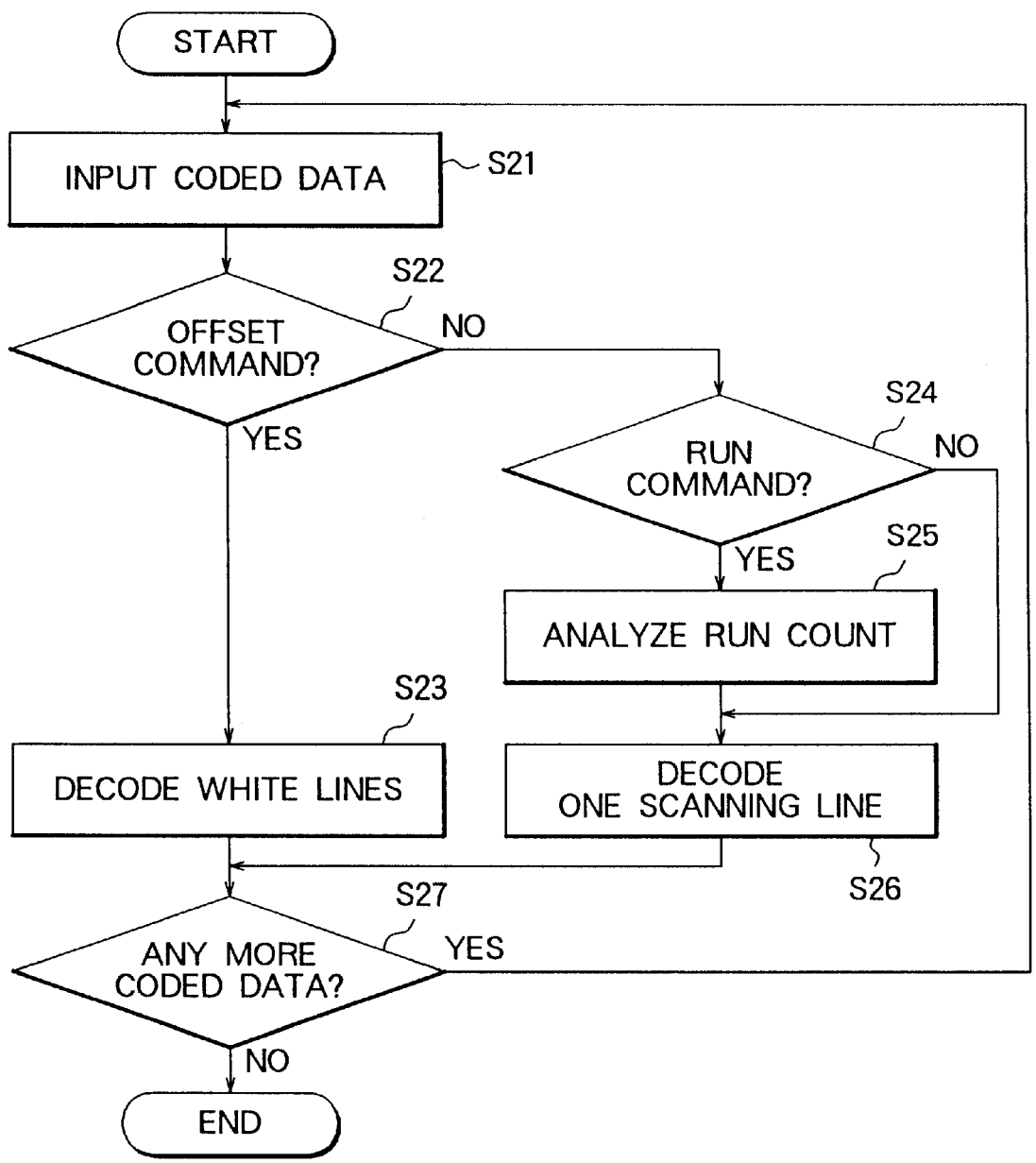
FIG. 6 is a flowchart illustrating decoding operations in the first embodiment.

The operation of the coder and decoder in the third embodiment follows the flowcharts shown in FIGS. 3, 4, and 6 for the first embodiment, so a repeated description will be omitted.

For sparse images with a restricted number of colors, the third embodiment provides the advantages noted in the first embodiment: fast coding and decoding, small memory requirements, and a high compression ratio. The third embodiment is also useful for coding sparse gray-scale images having a comparatively small number of gray levels, a run in this case being a run of pixels with identical gray levels.

Figure 15:
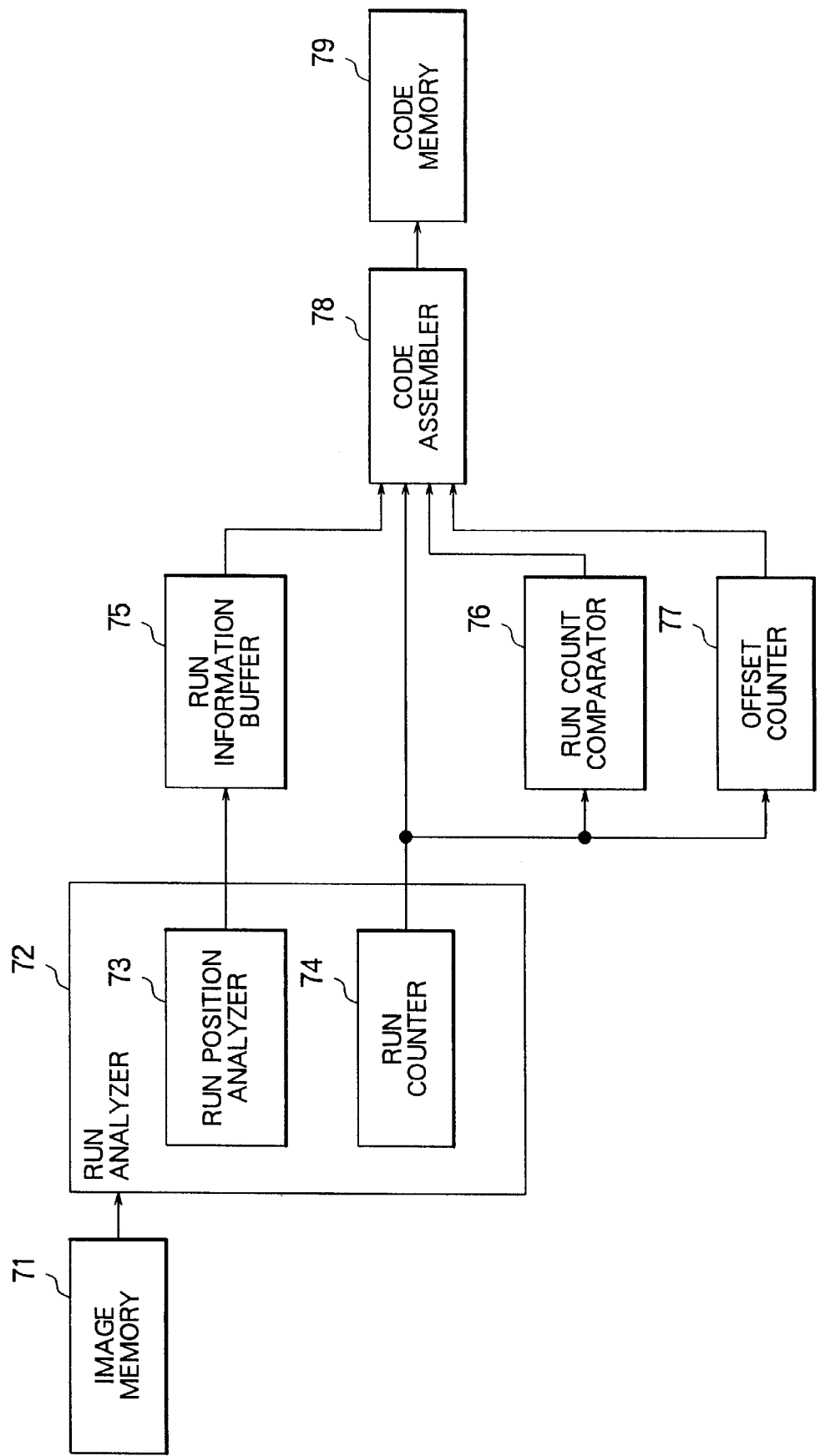
FIG. 15 is a block diagram of a coder according to a fourth embodiment of the invention.
Figure 16:
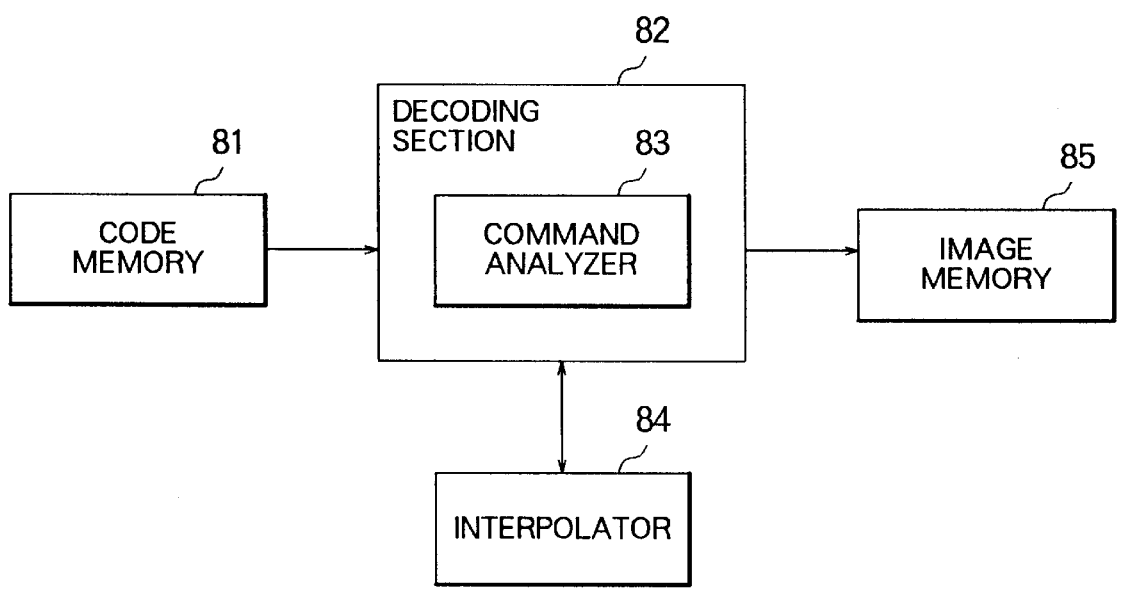
FIG. 16 is a block diagram of a decoder according to the fourth embodiment.

FIGS. 15 and 16 illustrate a coder and decoder according to a fourth embodiment, which encodes gray-scale information in a different way. The gray scale considered in the fourth embodiment has, for example, a minimum level corresponding to black, a maximum level corresponding to white, and at least one intermediate level. White pixels are considered to be background pixels.

The fourth embodiment counts runs of non-white pixels. The pixels in a run need not have the same gray level; the only requirement is that none of the pixels have the maximum (white) level. The run information describing a run of nonwhite pixels comprises the x-coordinates of the starting and ending pixels, the gray level of the starting pixel, also referred to below as the starting gray level, and the gray level of the ending pixel, also referred to as the ending gray level.

The coder in FIG. 15 comprises an image memory 71 that stores a gray-scale image, which is read one scanning line at a time by the run analyzer 72. The run position analyzer 73 analyzes runs of non-white pixels, and obtains run information giving the x-coordinates and gray levels of the starting and ending pixels in each run. The run counter 74 counts the total number of non-white runs in each scanning line. The run information buffer 75 temporarily stores the run information obtained by the run position analyzer 73 for each scanning line.

The run count comparator 76 and offset counter 77 receive the run count obtained by the run counter 74, and operate as did the black run count comparator 16 and offset counter 17 in the first embodiment. The run count comparator 76 compares the run count of each scanning line with the run count of the preceding scanning line, and produces a match signal or an unmatch signal. The offset counter 77 maintains an internal offset value representing the number of consecutive white lines, and outputs the offset value whenever the run count changes from zero to a non-zero value.

The code assembler 78 writes offset commands, run commands, and run information in the image memory 79, using information obtained from the run counter 74, the run count comparator 76, the offset counter 77, and the run information buffer 75.

The decoder shown in FIG. 16 has a code memory 81, a decoding section 82 with a command analyzer 83, an interpolator 84, and an image memory 85. The command analyzer 83 operates in the same way as the command analyzer in the first embodiment.

The decoding section 82 reads offset commands, run commands, and run information from the code memory 81, generates white lines, and stores the most recent run count as in the first embodiment. Run information read by the decoding section 82 is sent to the interpolator 84. The interpolator 84 uses the starting and ending x-coordinates to calculate the length of each run, subtracts the starting gray level from the ending gray level to obtain a difference value, and divides this difference value by the run length minus one to obtain a gray-level increment value. The interpolator 84 then assigns the starting gray level to the first pixel in the run, and assigns a gray level to each other pixel in the run by adding the gray-level increment value to the gray level of the preceding pixel. The decoding section 82 rounds these gray levels off as necessary, and writes the resulting pixel values in the image memory 85, inserting white pixels between runs, to generate decoded scanning lines.

Except for the interpolation step, the operation of the coder and decoder in the fourth embodiment follows the flowcharts shown in FIGS. 3, 4, and 6, so further description will be omitted.

For sparse gray-scale images, the fourth embodiment provides the same advantages as in the preceding embodiments: fast coding and decoding, small memory requirements, and a high compression ratio. Because the decoder interpolates gray levels in runs, the decoded image is not in general identical to the original image, but for certain types of images the differences are non-existent or negligible. The fourth embodiment is particularly useful in coding sparse three-dimensional images in which gray levels are used to express the depth dimension.

The invention can be practiced by embodying the invented coder and decoder by means of arithmetic, logic, and memory circuits in, for example, one or more semiconductor integrated circuits. The invention can also be practiced by embodying the functions of the coder and decoder in programs executable by a general-purpose processor, such as a microprocessor used in a computer or printer. The programs can be supplied at low cost on machine-readable media, such as rotating disk media or non-volatile memory media, or through communication networks.

As a variation of the fourth embodiment, the run analyzer 72 in the coder can compute the run length and gray-level increment value of each run, and store these values, together with the position and gray level of the starting pixel, as the run information in the run information buffer 75. The decoding process can thereby be simplified and speeded up.

As a variation of the third embodiment, the coder can store the starting position, run length, and pixel value of each run, and employ add and subtract commands instead of run commands, as in the second embodiment.

As a variation of the second embodiment, segments with non-zero run counts can be indicated by an add command, followed by the signed algebraic value of the difference from the preceding run count, instead of an add or subtract command followed by the absolute difference.

Those skilled in the art will recognize that further variations are possible within the scope claimed below.

What is claimed is:

1. A method of coding an image in which pixels are organized into successive scanning lines and take on a plurality of values, pixels having a particular one of said plurality of values being background pixels, comprising the steps of:

counting runs of non-background pixels in each scanning line, thereby obtaining a run count for each said scanning line;

counting consecutive scanning lines having run counts of zero;

coding a segment of consecutive scanning lines having identical run counts of zero as a first command and a first value, the first value indicating the number of scanning lines in the segment; and coding a segment of scanning lines having identical run counts not equal to zero as a second command and a second value, the second value indicating the run count of each scanning line in the segment, followed by one-dimensional run information describing each run of non-background pixels in each scanning line in the segment.

2. The method of claim 1, wherein said second value specifies the run count of the scanning lines in the segment coded by said second command.

3. The method of claim 1, wherein said second value specifies a difference from a run count of a preceding segment.

4. The method of claim 3, wherein said difference is an absolute difference, and said second command is selected from an add command and a subtract command.

5. The method of claim 1, wherein the run information for each run of non-background pixels comprises a starting coordinate and an ending coordinate.

6. The method of claim 1, wherein the run information for each run of non-background pixels comprises a starting coordinate and a run length.

7. The method of claim 1, wherein the run information for each run of non-background pixels comprises a single pixel value shared by all of the pixels in the run.

8. The method of claim 1, wherein the run information for each run of non-background pixels comprises a starting gray level and an ending gray level.

9. The method of claim 1, wherein the run information for each run of non-background pixels comprises a starting gray level and a gray-level increment value.

10. A machine-readable recording medium storing a machine-executable program for coding an image by the method of claim 1.

11. A method of decoding image data coded by the method of claim 1, comprising the steps of:

analyzing commands in said image data;

decoding each said first command and first value by generating scanning lines comprising only background pixels;

decoding each said second command and second value, thus determining an internal run count; and decoding the run information following each said second command and second value by generating scanning lines having runs of non-background pixels as described by the run information, placing a number of runs of non-background pixels equal to said internal run count in each scanning line thus generated.

12. The method of claim 11, further comprising the steps of:

setting said internal run count to zero when each said first command is detected; and modifying said internal run count by an arithmetic operation, using said second value, when each said second command is detected.

13. The method of claim 11, further comprising the step of assigning gray levels to the pixels in each run of non-background pixels by interpolating between a starting gray level and an ending gray level, the starting gray level and the ending gray level being given in the run information.

14. The method of claim 11, further comprising the step of assigning gray levels to the pixels in each run of non-background pixels by successively adding a gray-level increment value given in the run information to a starting gray level given in the run information.

15. A machine-readable recording medium storing a machine-executable program for decoding coded image data by the method of claim 11.

16. A coder for coding an image in which pixels are organized into successive scanning lines and take on a plurality of values, pixels having a particular one of said plurality of values being background pixels, comprising:

a run analyzer for counting runs of non-background pixels in each scanning line in said image, thereby obtaining a run count for each said scanning line, and obtaining one-dimensional run information describing each of said runs of non-background pixels;

a run information buffer coupled to said run analyzer, for temporarily storing said run information for each said scanning line;

a run count comparator coupled to said run analyzer, for comparing the run count of each said scanning line with the run count of a preceding scanning line;

an offset counter coupled to said run analyzer, for counting consecutive scanning lines having run counts of zero; and a code assembler coupled to said run count comparator, for outputting a first command and first value when said run count changes from zero to a non-zero value, said first value being provided by said offset counter, outputting a second command and second value when said run count changes from any value to a different non-zero value, said second value indicating said different non-zero value, and outputting the run information stored in said run information buffer.

17. The coder of claim 16, wherein said run count comparator sends said code assembler a signal indicating whether the run count of each said scanning line matches the run count of the preceding scanning line.

18. The coder of claim 17, wherein said second value is the run count obtained by said run analyzer.

19. The coder of claim 16, wherein said run count comparator sends said code assembler a difference value between the run count of each said scanning line and the run count of the preceding scanning line.

20. The coder of claim 19, wherein said second value is said difference value.

21. The coder of claim 19, wherein said second value is an absolute value of said difference value, and said second command indicates whether said difference value is positive or negative.

22. The coder of claim 16, wherein said run information comprises a starting coordinate and an ending coordinate for each run of non-background pixels.

23. The coder of claim 16, wherein said run information comprises a starting coordinate and a run length for each run of non-background pixels.

24. The coder of claim 16, wherein said run information comprises a single pixel value for each run of non-background pixels, said single pixel value being shared by all of the pixels in the run.

25. The coder of claim 16, wherein said run information comprises a starting gray level and an ending gray level for each run of non-background pixels.

26. The coder of claim 16, wherein said run information comprises a starting gray level and a gray-level increment value for each run of non-background pixels.

27. The coder of claim 16, further comprising an image memory storing said image in bit-mapped form.

28. The coder of claim 16, further comprising an image memory storing said image in run-length coded form.

29. A decoder for decoding coded image data describing an image in which pixels are organized into successive scanning lines and take on a plurality of values, pixels having a particular one of said plurality of values being background pixels, comprising:

a command analyzer for analyzing said coded image data to detect a first command designating a segment of consecutive scanning lines having only said background pixels, and a second command designating a segment of consecutive scanning lines having identical numbers of runs of non-background pixels; and a decoding section coupled to said command analyzer, for reading, from said coded image data, a first value accompanying said first command, a second value accompanying said second command, and one-dimensional run information describing runs of non-background pixels, generating consecutive scanning lines of background pixels in quantities specified by said first value, and generating scanning lines having the runs described by said run information, determining from said second value how many runs to place in each scanning line.

30. The decoder of claim 29, further comprising a run counter which is reset to zero when said first command is detected, and is incremented and decremented according to said second command and said second value.

31. The decoder of claim 29, further comprising an interpolator for assigning gray levels to the pixels in each run of non-background pixels by interpolating between a starting gray level and an ending gray level, the starting gray level and the ending gray level being given in said run information.

32. The decoder of claim 29, further comprising an interpolator for assigning gray levels to the pixels in each run of non-background pixels by successively adding a gray-level increment value to a starting gray level, the gray-level increment value and starting gray level being given in said run information.

33. An image coding and decoding apparatus for coding and decoding an image in which pixels are organized into successive scanning lines and take on a plurality of values, pixels having a particular one of said plurality of values being background pixels, comprising:

a run analyzer for counting runs of non-background pixels in each scanning line in said image, thereby obtaining a run count for each said scanning line, and obtaining one-dimensional run information describing each of said runs of non-background pixels;

a run information buffer coupled to said run analyzer, for temporarily storing said run information for each said scanning line;

a run count comparator coupled to said run analyzer, for comparing the run count of each said scanning line with the run count of a preceding scanning line;

an offset counter coupled to said run analyzer, for counting consecutive scanning lines having run counts of zero;

a code assembler coupled to said run count comparator, for outputting a first command and first value when said run count changes from zero to a non-zero value, said first value being provided by said offset counter, outputting a second command and second value when said run count changes from any value to a different non-zero value, said second value indicating said different non-zero value, and outputting the run information stored in said run information buffer, thereby generating coded image data;

a code memory coupled to said code assembler, for storing said coded image data;

a command analyzer coupled to said code memory, for analyzing said coded image data to detect said first command and said second command; and a decoding section coupled to said command analyzer, for reading said first value, said second value, and said run information from said coded image data, generating consecutive scanning lines of background pixels according to said first command and said first value, and generating scanning lines having the runs described by said run information, determining from said second value how many runs to place in each scanning line.

34. The image coding and decoding apparatus of claim 33, wherein said run count comparator sends said code assembler a signal indicating whether the run count of each said scanning line matches the run count of the preceding scanning line.

35. The image coding and decoding apparatus of claim 34, wherein said second value is the run count obtained by said run analyzer.

36. The image coding and decoding apparatus of claim 33, wherein said run count comparator sends said code assembler a difference value between the run count of each said scanning line and the run count of the preceding scanning line.

37. The coder of claim 36, wherein said second value is said difference value.

38. The image coding and decoding apparatus of claim 37, further comprising a run counter coupled to said command analyzer, which is reset to zero when said first command is detected, and incremented and decremented according to said second command and said second value.

39. The image coding and decoding apparatus of claim 36, wherein said second value is an absolute value of said difference value, and said second command indicates whether said difference value is positive or negative.

40. The image coding and decoding apparatus of claim 39, further comprising a run counter coupled to said command analyzer, which is reset to zero when said first command is detected, and incremented and decremented according to said second command and said second value.

41. The image coding and decoding apparatus of claim 33, wherein said run information comprises a starting coordinate and an ending coordinate for each run of non-background pixels.

42. The image coding and decoding apparatus of claim 33, wherein said run information comprises a starting coordinate and a run length for each run of non-background pixels.

43. The image coding and decoding apparatus of claim 33, wherein said run information comprises a single pixel value for each run of non-background pixels, said single pixel value being shared by all of the pixels in the run.

44. The image coding and decoding apparatus of claim 33, wherein said run information comprises a starting gray level and an ending gray level for each run of non-background pixels.

45. The image coding and decoding apparatus of claim 44, further comprising an interpolator coupled to said decoding section, for assigning gray levels to the pixels in each run of non-background pixels by interpolating between said starting gray level and said ending gray level.

46. The image coding and decoding apparatus of claim 33, wherein said run information comprises a starting gray level and a gray-level increment value for each run of non-background pixels.

47. The image coding and decoding apparatus of claim 46, further comprising an interpolator coupled to said decoding section, for assigning gray levels to the pixels in each run of non-background pixels by successively adding said gray level increment value to said starting gray level.

48. The image coding and decoding apparatus of claim 33, further comprising an image memory storing said image in bit-mapped form.

49. The image coding and decoding apparatus of claim 33, further comprising an image memory storing said image in run-length coded form.

* * * * *